United States Patent
Kimijima et al.

(10) Patent No.: US 9,671,011 B2
(45) Date of Patent: Jun. 6, 2017

(54) WORM BIASING STRUCTURE

(71) Applicant: Showa Corporation, Gyoda-shi (JP)

(72) Inventors: Tsutomu Kimijima, Haga-gun (JP); Makoto Watanabe, Haga-gun (JP); Tatsuya Saito, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/550,488

(22) Filed: Nov. 21, 2014

(65) Prior Publication Data

US 2015/0276047 A1    Oct. 1, 2015

(30) Foreign Application Priority Data

Mar. 26, 2014 (JP) ................................ 2014-064635

(51) Int. Cl.
  *F16H 57/12*    (2006.01)
  *F16H 1/16*    (2006.01)

(52) U.S. Cl.
  CPC .............. *F16H 57/12* (2013.01); *F16H 1/16* (2013.01); *F16H 2057/127* (2013.01); *Y10T 74/19623* (2015.01)

(58) Field of Classification Search
  CPC ...... F16H 57/12; F16H 1/16; F16H 2057/127; Y10T 74/19623
  See application file for complete search history.

(56) References Cited

U.S. PATENT DOCUMENTS

| | | | | |
|---|---|---|---|---|
| 4,619,155 A | * | 10/1986 | Futaba | B62D 3/123 180/428 |
| 6,247,375 B1 | * | 6/2001 | Gierc | B62D 3/12 74/388 PS |
| 6,527,642 B1 | * | 3/2003 | Arai | B62D 5/0409 180/444 |
| 6,860,829 B2 | * | 3/2005 | Bock | B62D 5/0409 180/443 |
| 7,048,088 B2 | * | 5/2006 | Bernhard | B62D 5/0409 180/444 |

(Continued)

FOREIGN PATENT DOCUMENTS

JP    2002-249056 A    9/2002
JP    2007-247790 A    9/2007

(Continued)

OTHER PUBLICATIONS

U.K. Search Report mailed May 18, 2015 for the corresponding U.K. Application No. GB1420814.4.

(Continued)

*Primary Examiner* — Paul N Dickson
*Assistant Examiner* — Timothy Wilhelm
(74) *Attorney, Agent, or Firm* — Leason Ellis LLP

(57) ABSTRACT

A worm biasing structure biasing a worm engaged with a worm wheel includes a radial bearing and an elastic body. The radial bearing supports the worm in a radial direction. The elastic body has elasticity and biases the radial bearing toward the worm wheel in a biasing direction. The elastic body includes a low-spring rate elastic body and a high-spring rate elastic body having a higher spring rate than that of the low-spring rate elastic body in series in the biasing direction.

14 Claims, 9 Drawing Sheets

(56) References Cited

U.S. PATENT DOCUMENTS

| | | | | |
|---|---|---|---|---|
| 7,721,616 | B2* | 5/2010 | Augustine | F16H 1/16 74/352 |
| 8,250,940 | B2* | 8/2012 | Ozsoylu | F16H 55/24 74/409 |
| 8,327,971 | B2* | 12/2012 | Kim | B62D 5/0409 180/444 |
| 8,336,412 | B1* | 12/2012 | Ishii | B62D 5/0409 180/444 |
| 8,646,351 | B2* | 2/2014 | Fuechsel | B62D 5/0454 74/388 PS |
| 8,863,599 | B2* | 10/2014 | Crossman | B62D 3/123 74/388 PS |
| 9,033,096 | B2* | 5/2015 | Yoshikawa | B62D 5/0409 180/444 |
| 9,051,001 | B2* | 6/2015 | Ishii | B62D 5/0409 |
| 9,080,646 | B2* | 7/2015 | Fuechsel | F16H 57/039 |
| 2005/0161277 | A1* | 7/2005 | Bock | B62D 5/0409 180/400 |
| 2007/0028711 | A1* | 2/2007 | Beutler | B62D 3/123 74/409 |
| 2007/0205039 | A1* | 9/2007 | Imagaki | B62D 5/0409 180/444 |
| 2007/0209463 | A1* | 9/2007 | Song | B62D 3/123 74/388 PS |
| 2013/0126260 | A1* | 5/2013 | Kim | B62D 5/0409 180/444 |
| 2015/0266506 | A1* | 9/2015 | Sato | B62D 5/0409 180/444 |

FOREIGN PATENT DOCUMENTS

| | | |
|---|---|---|
| JP | 2008-081060 A | 4/2008 |
| JP | 2013-208932 A | 10/2013 |

OTHER PUBLICATIONS

Office Action mailed Nov. 29, 2017 for the corresponding Japanese Patent Application No. 2014-064635.

* cited by examiner

<INITIAL STATE>

<SEPARATING FORCE SMALL>

<INITIAL STATE>

<SEPARATING FORCE SMALL>

<INITIAL STATE>

<SEPARATING FORCE SMALL>

WORM BIASING STRUCTURE

CROSS-REFERENCE TO RELATED APPLICATIONS

This application is based on and claims priority under 35 USC 119 from Japanese Patent Application No. 2014-064635 filed on Mar. 26, 2014, the entire content of which is incorporated herein by reference.

BACKGROUND OF THE INVENTION

1. Technical Field

The present invention relates to a worm biasing structure.

2. Related Art

A rotating force of a motor for assistance generating an assisting force is generally transmitted to a pinion shaft and so on through a speed reduction mechanism in a motor-driven power steering apparatus. The speed reduction mechanism includes, for example, a worm gear mechanism and so on.

When the motor-driven power steering apparatus is, for example, a pinion-assist type apparatus, the speed reduction mechanism includes a worm connected to an output shaft of a motor and a worm wheel engaged with the worm and fixed to the pinion shaft. In Patent Literature 1 (JP-A-2013-208932), the worm is biased toward the worm wheel by a spring force of one kind of compression coil spring so that the worm is engaged with the worm wheel in good condition and for preventing backlash between the worm and the worm wheel even when the worm and/or the worm wheel are worn out.

SUMMARY OF THE INVENTION

However, when the motor is suddenly rotated and a large force (separating force) is generated in the worm in a direction in which the worm is separated from the worm wheel in a case where a driver rapidly steers, there is a danger that a compression coil spring reaches a compression limit and a bearing hits against a housing and so on to generate a slapping sound (hitting sound).

In view of the above, an illustrative aspect of the invention provide a worm biasing structure in which the slapping sound is not easily generated even when the large separating force is generated in the worm.

According to an aspect of the invention, there is provided a worm biasing structure biasing a worm engaged with a worm wheel including a radial bearing supporting the worm in a radial direction and an elastic body having elasticity and biasing the radial bearing toward the worm wheel in a biasing direction, in which the elastic body includes a low-spring rate elastic body and a high-spring rate elastic body having a higher spring rate than that of the low-spring rate elastic body in series in the biasing direction.

According to the structure, as the low-spring rate elastic body and the high-spring rate elastic body are included in series in the biasing direction, for example, when a small separating force is generated in the worm, the lower-spring rate elastic body with a lower spring rate is elastically deformed preferentially, therefore, the separating force can be absorbed and damped. Accordingly, the radial bearing does not easily hit against the housing and so on and the slapping sound (hitting sound) is not easily generated.

When a large separating force is generated in the worm, the high-spring rate elastic body is elastically deformed in addition to the low-spring rate elastic body, therefore, the separating force can be absorbed and clamped. Accordingly, the radial bearing does not easily hit against the housing and so on and the slapping sound (hitting sound) is not easily generated.

The worm biasing structure may have a configuration in which, the high-spring rate elastic body starts to be compressed before the low-spring rate elastic body reaches a compression limit.

According to the structure, as the high-spring rate elastic body starts to be compressed before the low-spring rate elastic body reaches the compression limit, the separating force can be absorbed and damped by the high-spring rate elastic body at an early timing.

The worm biasing structure may have a configuration in which the low-spring rate elastic body is formed by a coil spring, and the high-spring rate elastic body includes a guide portion guiding the coil spring in an extension/compression direction.

According to the structure, the coil spring can be guided in the extension/compression direction by the guide portion. Accordingly, the coil spring does not easily fall.

The worm biasing structure may have a configuration in which the low-spring rate elastic body is a flat-wire coil spring formed by flat wires being wound.

According to the structure, as the low-spring rate elastic body is a flat-wire coil spring formed by flat wires being wound, the coil spring does not easily fall.

According to the aspect of the present invention, it is possible to provide a worm biasing structure in which the slapping sound is not easily generated even when the large separating force is generated in the worm.

BRIEF DESCRIPTION OF THE DRAWINGS

FIGS. 4A and 4B are views showing a holder according to the first embodiment, in which FIG. 4A is a perspective view and FIG. 4B is a front view;

FIGS. 6A and 6B are enlarged cross-sectional views of the worm biasing structure according to the first embodiment, in which FIG. 6A shows an initial state and FIG. 6B shows a state where a small separating force is generated;

FIGS. 8A and 8B are enlarged cross-sectional views of the worm biasing structure according to a second embodiment, in which FIG. 8A shows an initial state and FIG. 8B shows a state where a small separating force is generated; and FIGS. 9A and 9B are enlarged cross-sectional views of the worm biasing structure according to a modification example, in which FIG. 9A shows an initial state and FIG. 9B shows a state where a small separating force is generated.

DETAILED DESCRIPTION OF THE INVENTION

<First Embodiment>

Figure 1:
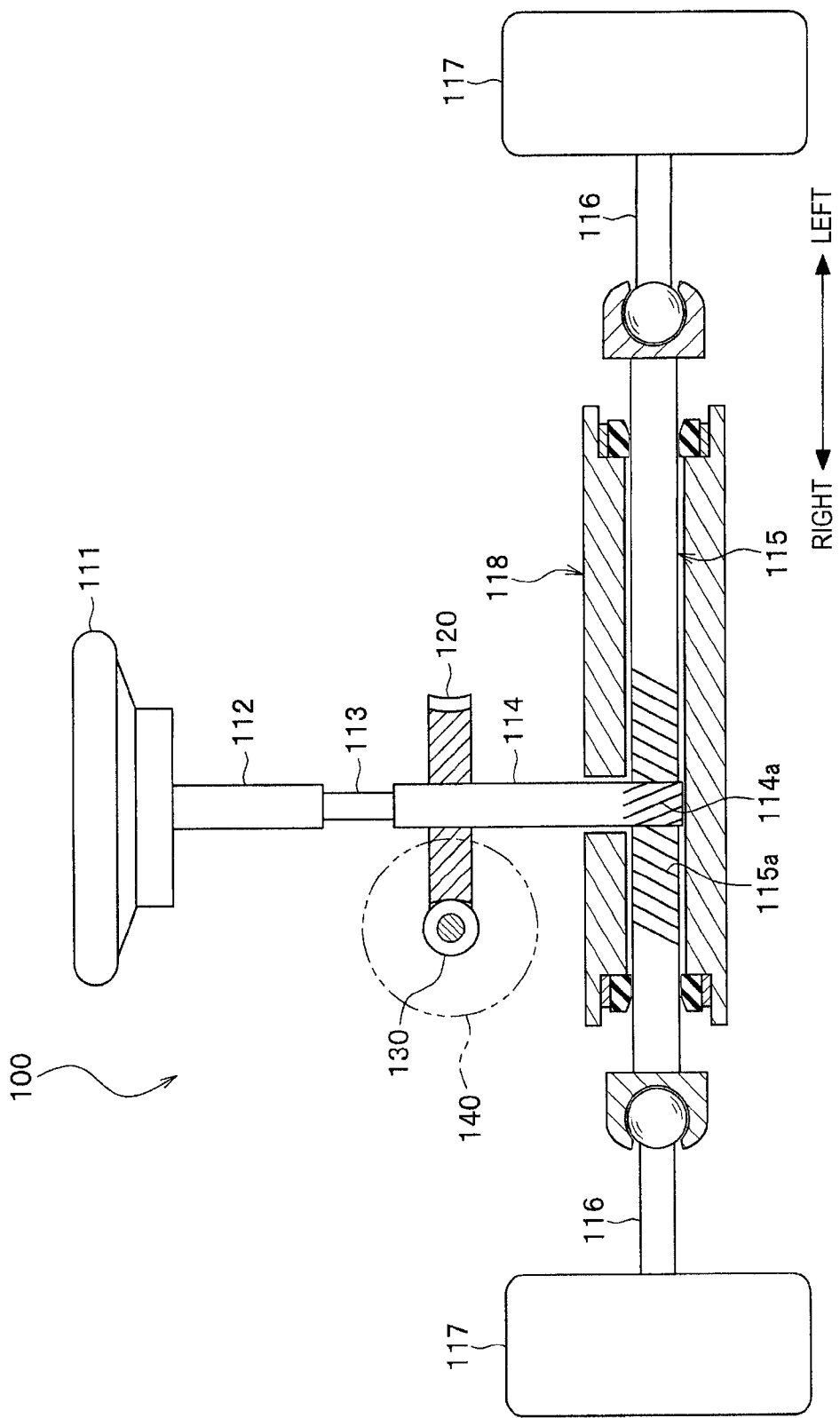
FIG. 1 is a structure view of a motor-driven power steering apparatus according to a first embodiment.

A first embodiment of the present invention will be explained with reference to FIG. 1 to FIG. 7.

<Structure of Motor-Driven Power Steering Apparatus>

A motor-driven power steering apparatus 100 (steering apparatus) is a pinion-assist type apparatus in which an assisting force is inputted to a pinion shaft 114. However, a column-assist type apparatus and a rack-assist type apparatus can be applied.

The motor-driven power steering apparatus 100 includes a steering wheel 111 operated by a driver, a steering shaft 112 integrally rotating with the steering wheel 111, a torsion bar 113 connected to a lower end of the steering shaft 112, a pinion shaft 114 connected to a lower end of the torsion bar 113 and a rack shaft 115 extending in a vehicle width direction (right and left direction).

Pinion tooth 114a of the pinion shaft 114 are engaged with rack tooth 115a of the rack shaft 115. When the pinion shaft 114 rotates around an axis of rotation O1 (see FIG. 2), the rack shaft 115 moves in the vehicle width direction and steered wheels (vehicle wheels) 117 are steered through a tie rod 116. The rack shaft 115 is housed in a tubular housing 118 through a bush and so on.

Figure 2:
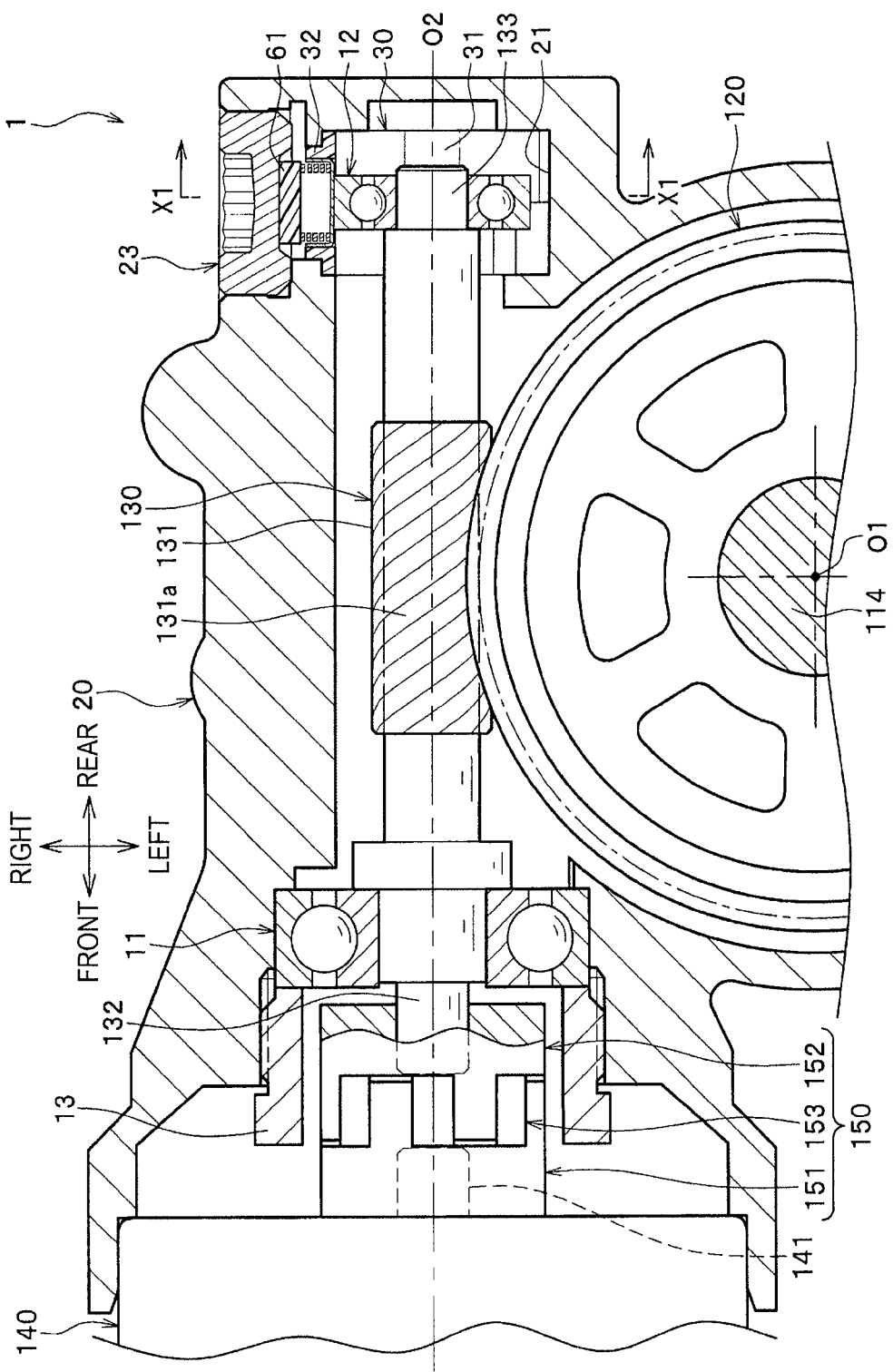
FIG. 2 is a plane-cross sectional view (cross-sectional view taken along X2-X2 line of FIG. 5) of the motor-driven power steering apparatus according to the first embodiment.
Figure 3:
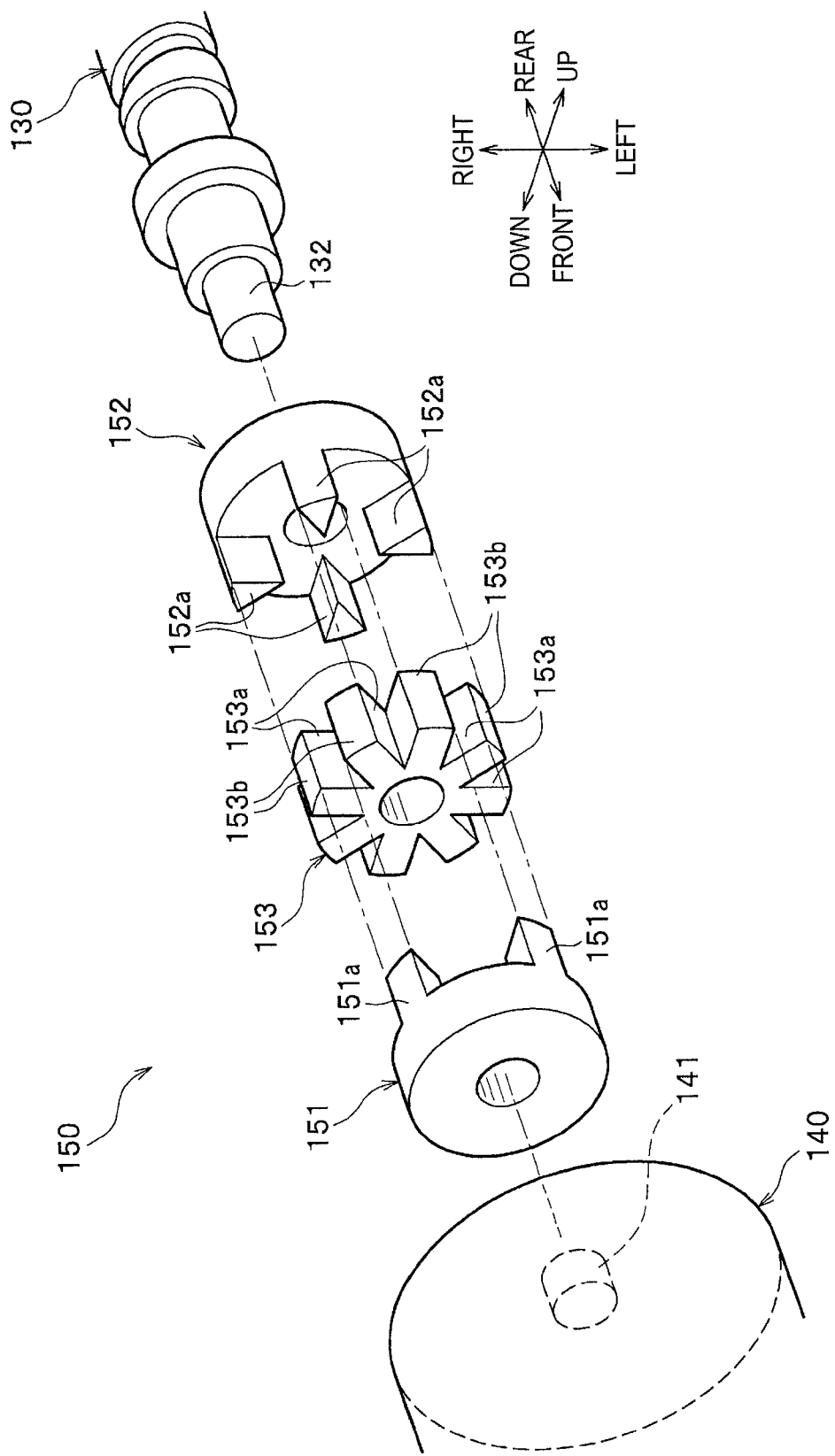
FIG. 3 is an exploded perspective view of a joint according to the first embodiment.

The motor-driven power steering apparatus 100 also includes a worm wheel 120 co-axially fixed to the pinion shaft 114, a worm 130 engaged with the worm wheel 120, an electric motor 140 generating the assisting force to rotate the worm 130, a joint 150 connecting an output shaft 141 of the motor 140 to the worm 130 and a housing 20 housing the worm 130 and the like (see FIG. 2).

(Worm Wheel)

The worm wheel 120 is serration-connected to the pinion shaft 114. That is, the worm wheel 120 is rotatably attached to the pinion shaft 114 in a co-axial manner.

(Worm)

The worm 130 is an approximately cylindrical part which rotates around an axis of rotation O2 (see FIG. 2), including a worm body 131 in which gear tooth 131a are formed on a peripheral surface thereof, a first shaft portion 132 formed in one end side (motor 140 side) of the worm body 131 and a second shaft portion 133 formed in the other end side (opposite side of the motor 140) of the worm body 131.

The first shaft portion 132 is supported by the housing 20 so as to be rotatable through a first bearing 11. The second shaft portion 133 is supported by the housing 20 so as to be rotatable through a holder 30.

When the motor 140 is driven and the worm 130 is rotated, the gear tooth 131a of the worm 130 tend to get over wheel tooth formed on an outer peripheral surface of the worm wheel 120. That is, a separating force acting so as to be separated from the worm wheel 120 is generated in the worm 130, and the worm 130 tends to be separated from the worm wheel 120. For example, when the steering wheel 111 is rapidly operated and the motor 140 is rapidly driven, the large separating force is generated in the worm 130.

(Motor)

The motor 140 is an electric motor driven in accordance with an instruction by a not-shown ECU (Electronic Control Unit) and generating the assisting force. The output shaft 141 of the motor 140 is connected to the first shaft portion 132 through the joint 150. The ECU detects a torsion torque generated in the torsion bar 113 through a torque sensor (not shown) and drives the motor 140 in accordance with the size of the torsion torque to generate the assisting force.

(Joint)

The joint 150 connects between the output shaft 141 and the first shaft portion 132 to transmit power of the motor 140 to the worm 130. The joint 150 includes a first coupling 151 rotatably attached to the output shaft 141, a second coupling 152 rotatably attached to the first shaft portion 132 and a bush 153 sandwiched between the first coupling 151 and the second coupling 152.

In the bush 153 side of the first coupling 151, plural (four in this case) first engaging claws 151a are formed in a circumferential direction at equal intervals. In the bush 153 side of the second coupling 152, plural (four in this case) second engaging claws 152a are formed in a circumferential direction at equal intervals.

The bush 153 is a part made of an elastic body such as rubber, in which plural (eight in this case) engaging holes 153a extending in the axis direction are formed in a circumferential direction at equal intervals. In other words, engaging claws 153b are formed between engaging holes 153a adjacent to each other in the circumferential direction.

The plural first engaging claws 151a and the plural second engaging claws 152a are engaged with the plural engaging holes 153a alternately in the circumferential direction. Accordingly, the rotating force (power) of the motor 140 is transmitted to the worm 130 through the first coupling 151, the bush 153 and the second coupling 152.

Additionally, as the engaging claws 153b made of rubber and so on are interposed between the first engaging claws 151a and the second engaging claws 152a in the circumferential direction so that the first engaging claws 151a and the second engaging claws 152a do not directly contact to each other, a slapping sound and backlash in the circumferential direction can be reduced.

(First Bearing)

The first bearing 11 is provided between the first shaft portion 132 of the worm 130 and the housing 20, supporting the first shaft portion 132 so as to be rotatable with respect to the housing 20. The first bearing 11 is formed by, for example, a radial ball bearing, supporting a load in a radial direction. The first bearing 11 is held in the housing 20 by a cylindrical stopper member 13 screwed with the housing 20.

(Second Bearing)

The second bearing 12 (radial bearing) is provided between the second shaft portion 133 of the worm 130 and the housing 20, supporting the second shaft portion 133 so as to be rotatable with respect to the housing 20. The second bearing 12 is formed by, for example, a radial ball bearing, supporting a load in a radial direction. The second bearing is housed in the holder 30 (see FIGS. 4A and 4B).

(Housing)

The housing 20 houses the worm wheel 120, the worm 130 and so on. In the housing 20, a holder housing hole 21 holding the later-described holder 30 is formed. The holder holding hole 21 has a short cylindrical shape, and an axis direction thereof extends in the axis direction of the worm 130. The holder housing hole 21 communicates to the outside through a later-described communicating hole 22 extending in a later-described biasing direction (radial direction (separating direction) of the worm 130). Moreover, a cap 23 screwed with the housing 20 blocks the communicating hole 22.

(Worm Biasing Structure)

The motor-driven power steering apparatus 100 includes a worm biasing structure 1 biases the second bearing 12 (worm 130) toward the worm wheel 120 to give a preload to the worm 130. The biasing direction in which the second bearing 12 (worm 130) is biased is the right and left direction in FIG. 5 (upper and lower direction on paper), which is a radial direction of the worm 130.

The worm biasing structure 1 includes the second bearing 12, the holder 30, a cup 40, a compression coil spring 50 (low-spring rate elastic body) and a resin body 61 (high-spring rate elastic body). That is, the worm biasing structure 1 includes the compression coil spring 50 and the resin body 61 as the elastic bodies biasing the second bearing (worm 130).

(Holder)

Figure 4A:
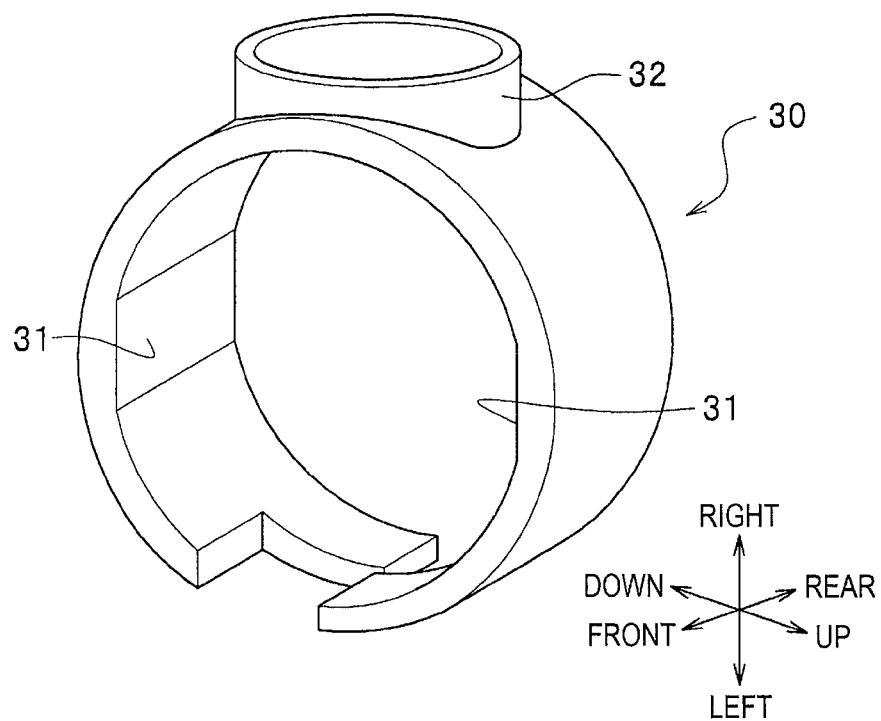
Figure 4B:
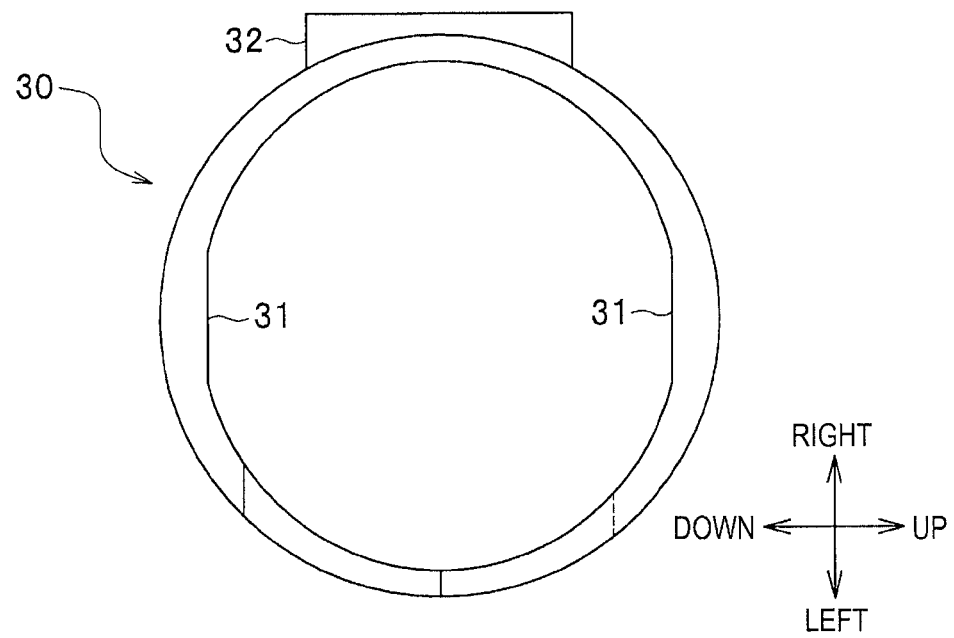
Figure 5:
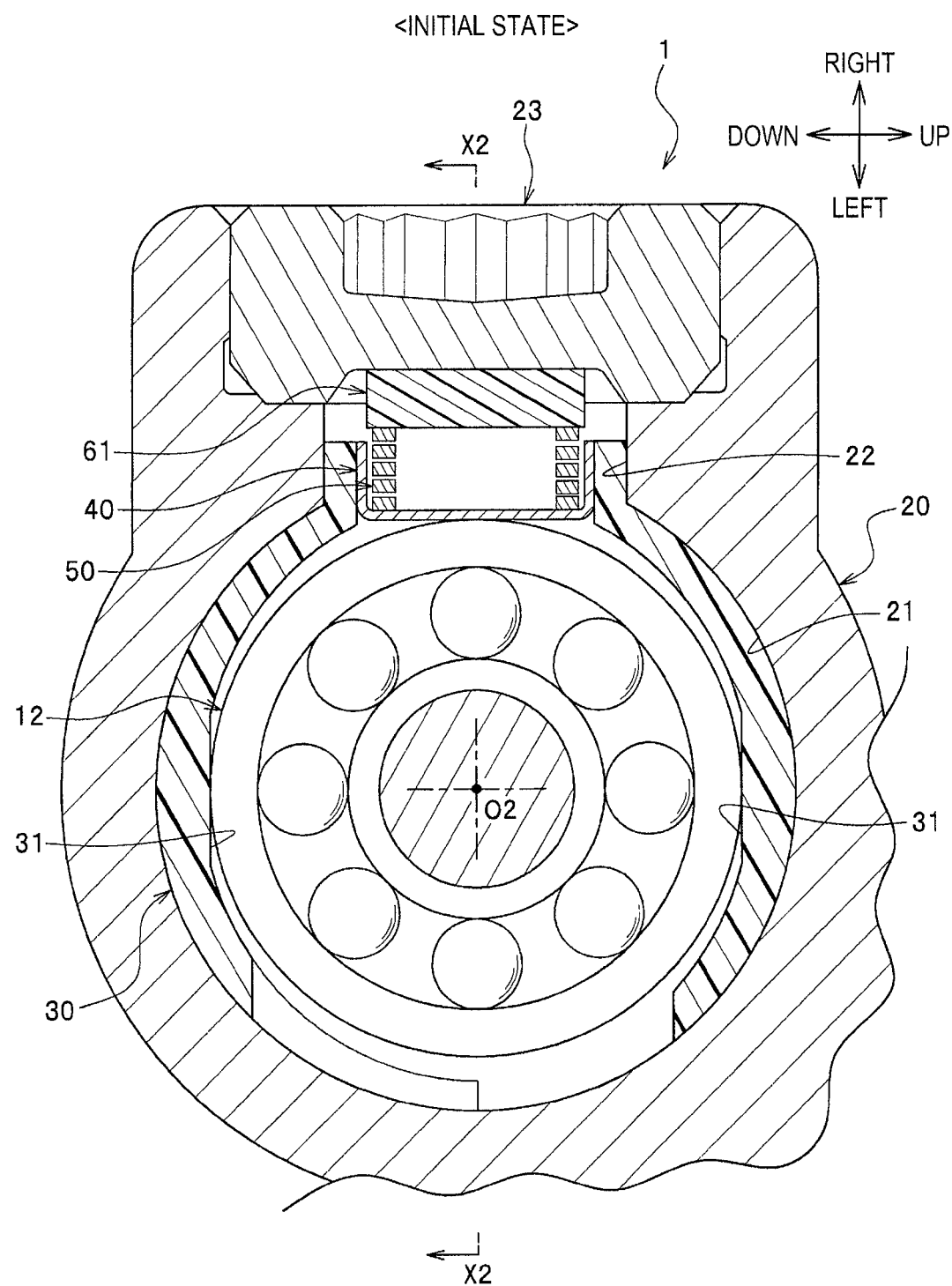
FIG. 5 is a cross-sectional view (cross-sectional view taken along X1-X1 line of FIG. 2) of a worm biasing structure according to the first embodiment, showing an initial state.

The holder 30 shows an approximately annular shape as shown in FIGS. 4A, 4B and FIG. 5, which is a member covering the outside of the second bearing 12 to hold the second bearing 12. The holder 30 has a C-shape in which the worm wheel 120 side is cut out in an axis-direction view. The holder 30 is housed in the holder housing hole 21 with a slightly reduced diameter.

In an inner peripheral surface of the holder 30, a pair of guide surfaces 31, 31 extending in the biasing direction (right and left direction) of the worm 130 are formed. That is, the second bearing 12 can slide in the biasing direction of the worm 130 while slidingly contacting the guide surfaces 31, 31.

A spring housing portion 32 having a short cylindrical shape is formed in the holder 30 in the opposite side of the worm wheel 120. The spring housing portion 32 is a portion for housing the compression coil spring 50, a hollow portion of which extends to the biasing direction (right and left direction) of the worm 130.

(Cup)

The cup 40 shows a bottomed cylindrical shape in which the second bearing 12 side is closed, which is housed inside the spring housing portion 32 so as to slide freely. The cup 40 includes a cylindrical peripheral wall portion 41 and a bottom wall portion 42 formed in the second bearing 12 side of the peripheral wall portion 41.

The peripheral wall portion 41 has a certain degree of length in the sliding direction of the cup 40, and an outer peripheral surface of the peripheral wall portion 41 slidingly contacts an inner peripheral surface of the spring housing portion 32.

An outer surface 42a of the bottom wall portion 42 makes a line contact with an outer peripheral surface of the second bearing 12. That is, a contact portion between the bottom wall portion 42 and the second bearing 12 linearly extends in the axis direction of the second bearing 12. Accordingly, a biasing force of the compression coil spring 50 and the resin body 61 is transmitted to the worm 130 through the cup 40 in good condition.

(Compression Coil Spring)

The compression coil spring 50 is an elastic body (biasing member) having elasticity and biasing the second bearing 12 (worm 130) toward the worm wheel 120. The compression coil spring 50 extends along the biasing direction in the spring housing portion 32, in which one end 51 abuts on the bottom wall portion 42 of the cup 40 and the other end 52 abuts on the resin body 61.

Figure 6A:
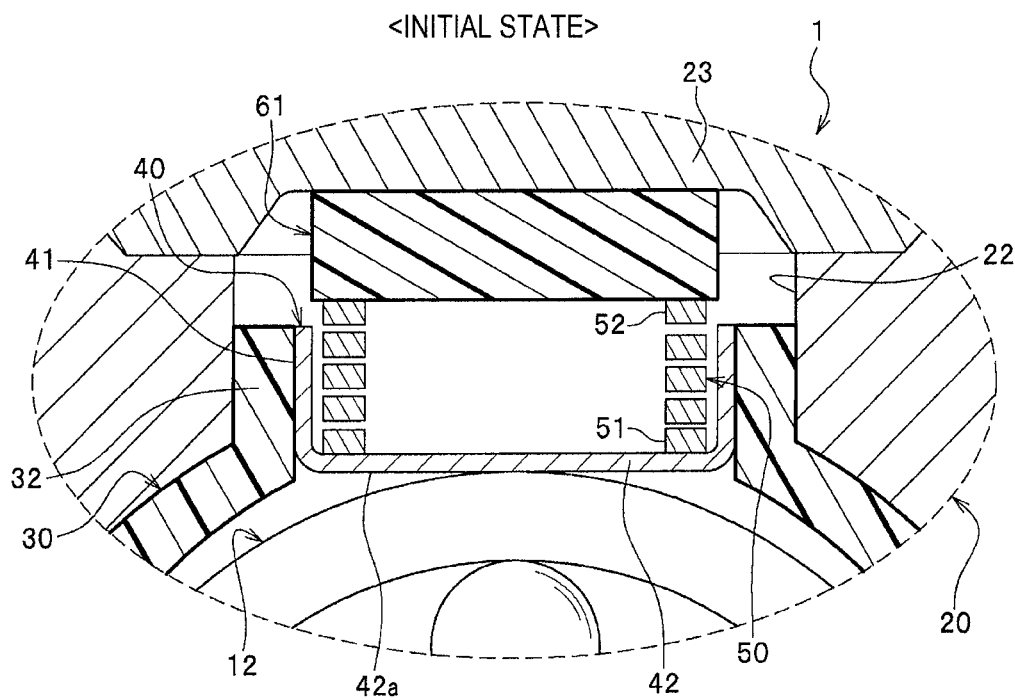

In an initial state in which the motor 140 is not rotated and the separating force is not generated in the worm 130 (see FIG. 5 and FIG. 6A, the compression coil spring 50 and the resin body 61 bias the second bearing 12 (worm 130) toward the worm wheel 120.

A spring rate (degree of elasticity) of the compression coil spring 50 is set to be lower than a spring rate of the resin body 61. Accordingly, the compression coil spring 50 is compressed and deformed (elastically deformed) before the resin body 61.

The compression coil spring 50 is formed by a flat-wire coil spring (flat coil spring) formed by flat wires being wound. Accordingly, the compression coil spring 50 does not easily fall even when the spring is retracted. Note that the compression coil spring 50 is formed by a round-wire coil spring (round oil spring) formed by round wires being wound.

(Resin Body)

The resin body 61 is an elastic body (biasing member) having elasticity and biasing the worm 130 toward the worm wheel 120. The resin body 61 is made of synthetic resin and has a short cylindrical shape, which is housed inside the spring housing portion 32 and the axis direction thereof extends along the biasing direction of the worm 130.

The resin body 61 is provided between the compression coil spring 50 and the cap 23 in the biasing direction. That is, the compression coil spring 50 and the resin body 61 are arranged in series in the biasing direction. However, the resin body 61 may be arranged between the compression coil spring 50 and the cup 40.

The spring rate (degree of elasticity) of the resin body 61 is set to be higher than a spring rate of the compression coil spring 50 in the biasing direction. Accordingly, when the large separating force is acted on the second bearing 12 (worm 130), the resin body 61 is compressed and deformed after the compression coil spring 50 is retracted and reaches a compression limit, thereby damping the separating force.

<Operation and Effect of Worm Biasing Structure>

Operation and effect of the worm biasing structure 1 will be explained.

(Separating Force: Small)

Figure 6B:
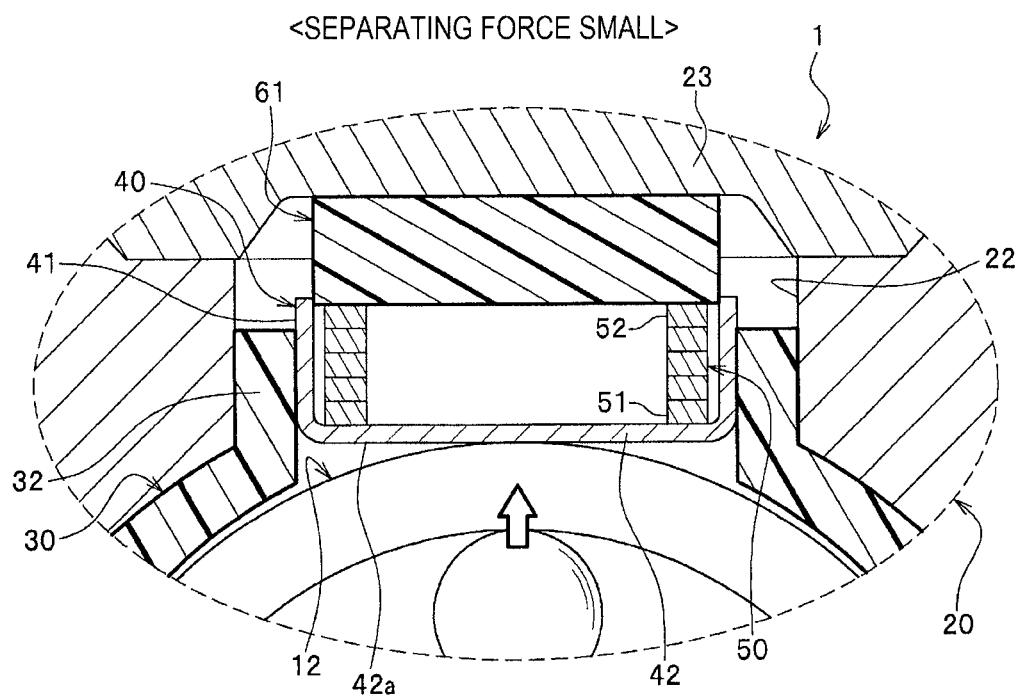
Figure 7:
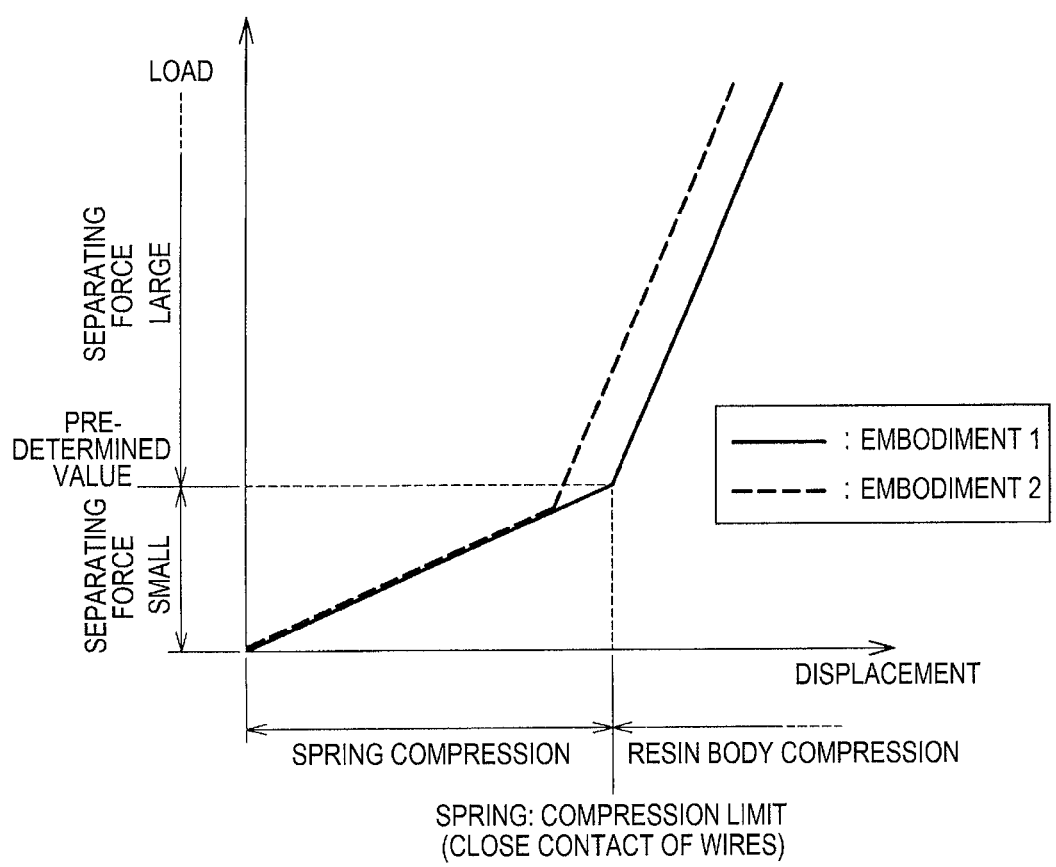
FIG. 7 is a graph showing an effect of the worm biasing structure according to the first embodiment.

When a separating force (load) smaller than a predetermined value is generated in the worm 130, the compression coil spring 50 as the low-spring rate elastic body is preferentially retracted and the separating force is damped (absorbed) (see FIG. 6B and FIG. 7). As the compression coil spring 50 is retracted in good condition as described above, the small separating force is damped while securing a stroke amount (displacement amount) of the second bearing 12, which can suppress the slapping sound occurring between the second bearing 12 and the holder 30.

FIG. 7 shows the relation in which the displacement amount (the length of retraction of the compression coil spring 50) of the second bearing 12 (worm 130) is increased as the separating force is increased. When the separating force is the predetermined value, the compression coil spring 50 reaches the compression limit, and the flat wires included in the compression coil spring 50 closely contact one another in the biasing direction (see FIG. 6B, Embodiment 1)

(Separating Force: Large)

When a separating force (load) larger than a predetermined value is generated in the worm 130, the resin body 61 as the high-spring rate elastic body is compressed in addition to the retracted compression coil spring 50, and the separating force is damped (absorbed) (see FIG. 7). As the resin body 60 is compressed in good condition as described above, the large separating force is damped while securing the stroke amount (displacement amount) of the second bearing 12, which can suppress the slapping sound occurring between the second bearing 12 and the holder 30.

FIG. 7 shows the relation in which the displacement amount (the length of retraction of the compression coil spring 50) of the second bearing 12 (worm 130) is increased as the separating force is increased. Moreover, as the resin body 61 has a higher spring rate than that of the compression coil spring 30, the separating force necessary for compressing the resin body 61 in a unit displacement amount (gradient of a graph in FIG. 7) is larger than the separating force necessary for compressing the compression coil spring 50 in a unit displacement amount.

(Summary)

As described above, the compression coil spring 50 and the resin body 61 are compressed in good condition in both cases in which the small separating force is generated and the large separating force is generated in the worm 130, therefore, the slapping sound (hitting sound) occurring between the second bearing 12 and the holder 30 can be suppressed while securing the stroke amount (displacement amount) of the second bearing 12 (worm 130).

(Modification Example)

The embodiment of the present invention has been explained as the above, however, the present invention is not limited to the above and can be modified, for example, as described below.

In the above embodiment, the structure in which the low-spring rate elastic body is the compression coil spring 50, and the high-spring rate elastic body is the resin body 61 made of synthetic resin has been cited as the example. In addition to the above, for example, a structure in which the low-spring rate elastic body and the high-spring rate elastic body are compression coil springs. In this case, the low-spring rate elastic body and the high-spring rate elastic body can be formed, for example, by changing the girth of wire.

Also, the low-spring rate elastic body and the high-spring rate elastic bodies may be elastic body made of rubber. In this case, the low-spring rate elastic body and the high-spring rate elastic body can be formed, for example, by changing the rigidity of rubber.

<Second Embodiment>

Figure 8A:
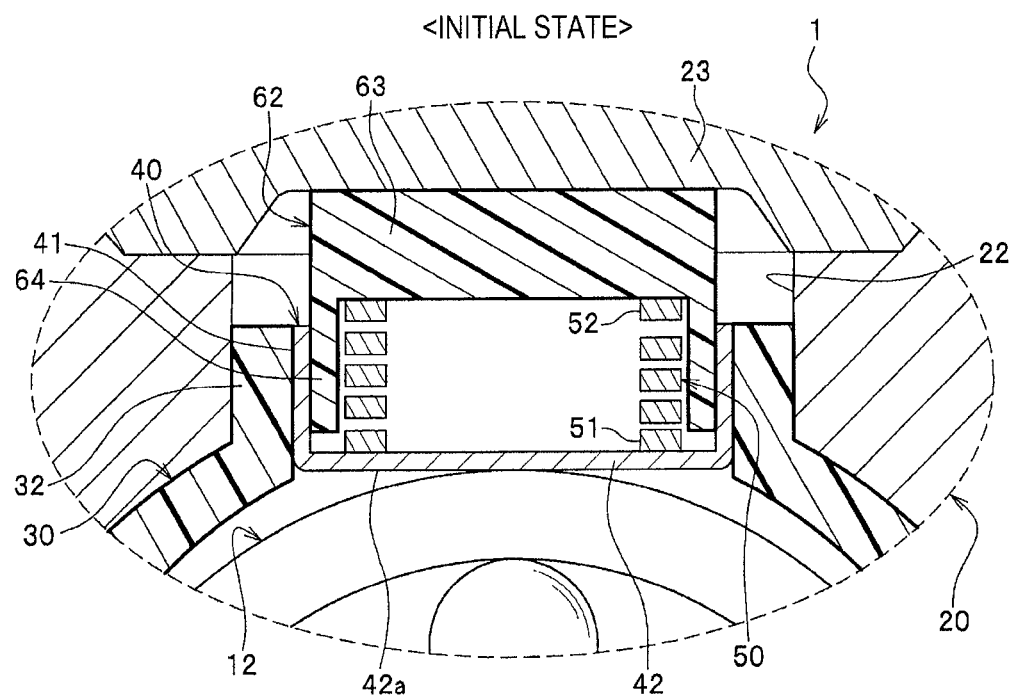

A second embodiment of the present invention will be explained with reference to FIGS. 8A and 8B. Portions different from those of the first embodiment will be explained.

The worm biasing structure 1 according to a second embodiment includes a resin body 62 instead of the resin body 61. The resin body 62 includes a cylindrical body 63 equivalent to the resin body 61 and a cylindrical guide portion 64 extending from an outer peripheral edge of a spring-side surface of the body 63 toward the worm 130.

The compression coil spring 50 extends inside the cylindrical guide portion 64, the other end 52 abuts on the body 63. That is, the guide portion 64 guides the compression coil spring 50 in an extension/compression direction. Accordingly, the compression coil spring 50 does not easily fall inside the guide portion even when the spring is retracted.

Figure 8B:
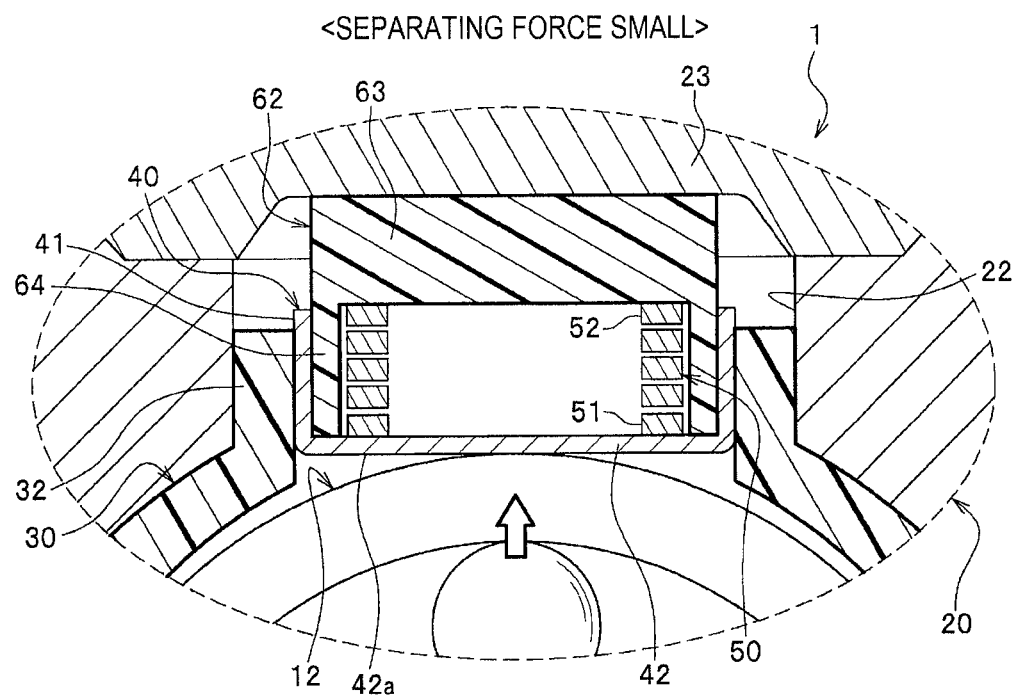

A length of the guide portion 64 in the axis direction is set to a length in which the guide portion 64 touches the bottom wall portion 42 before the compression coil spring 50 is completely retracted, that is, before the compression coil spring 50 reaches the compression limit (see FIG. 7 and FIG. 8B). Accordingly, the resin body 62 starts to be compressed before the compressed coil spring 50 is completely retracted, which can absorb the separating force in good condition and can damp the separating force.

That is, the resin body 62 starts to be compressed in a displacement amount shorter than that of the first embodiment as shown by a dashed line "Embodiment 2" in FIG. 7. Accordingly, the large separating force is damped at an earlier timing than that in the first embodiment.

Figure 9A:
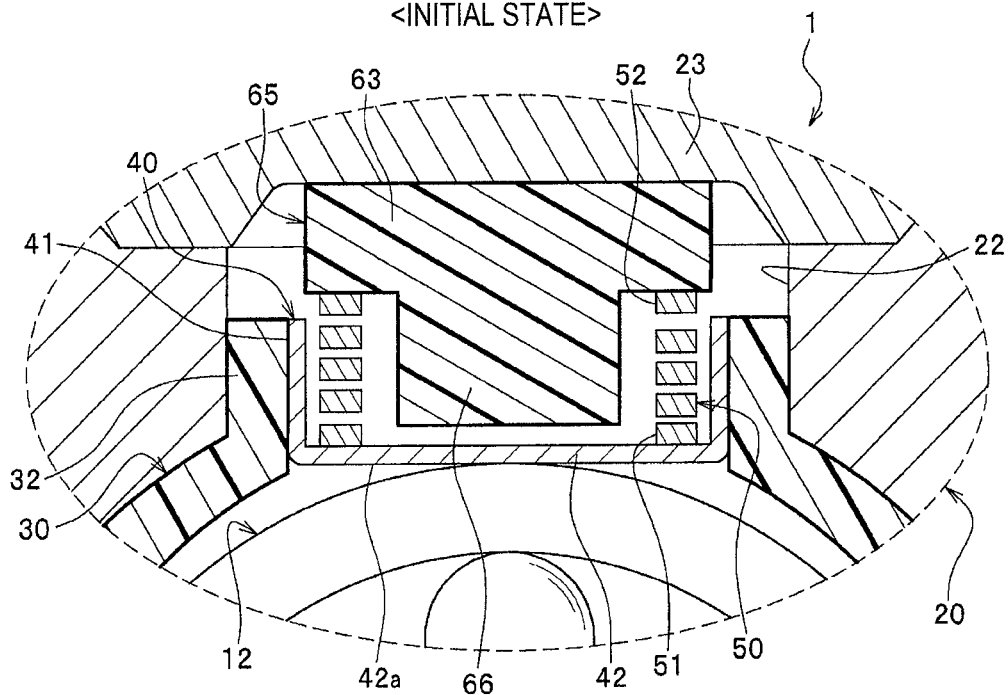
Figure 9B:
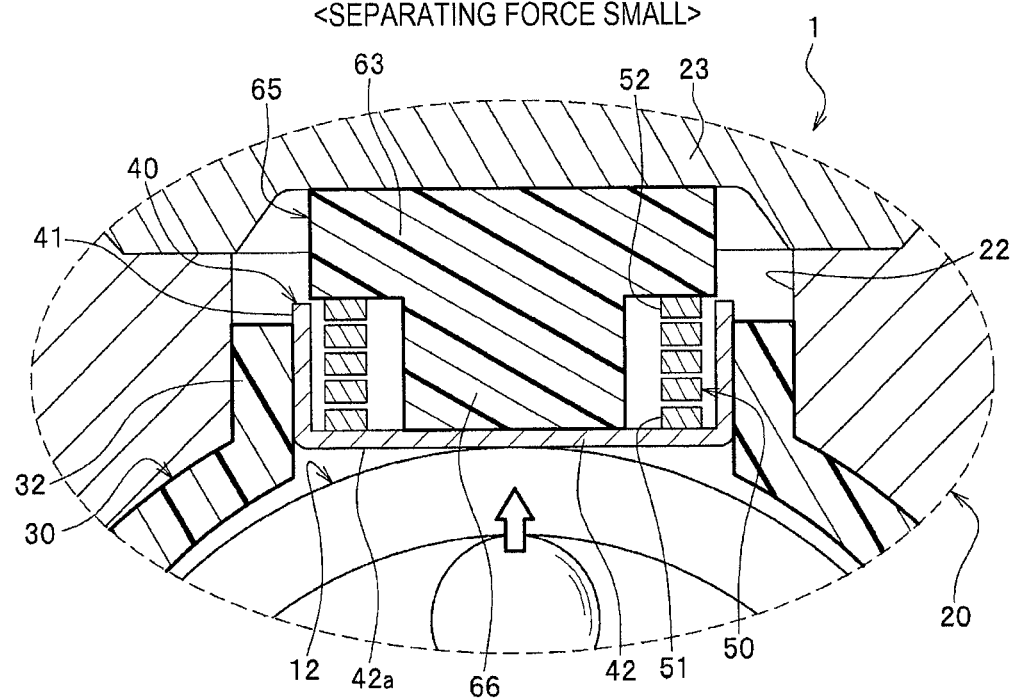

Note that a structure of including a resin body 65 as shown in FIGS. 9A and 9B instead of the resin body 62 can be also applied. The resin body 65 includes the cylindrical body 63 and a guide portion 66 having a long cylindrical shape extending from the center of the spring-side surface of the body 63 toward the worm 130. The guide portion 66 is movably inserted into the compression coil spring 50, guiding the compression coil spring 50 in the biasing direction. A length of the guide portion in the axis direction is set to a length in which the guide portion 66 touches the bottom wall portion 42 before the compression coil spring 50 is completely retracted, that is, before the compression coil spring 50 reaches the compression limit (see FIG. 9B).

What is claimed is:

1. A worm biasing structure comprising:
   a worm;
   a worm wheel with which the worm is engaged;
   a radial bearing supporting the worm in a radial direction; and
   an elastic body having elasticity and pushing the radial bearing toward the worm wheel in a biasing direction in an initial state where no separation force is generated,
   wherein the elastic body includes a low-spring rate elastic body and a high-spring rate elastic body having a higher spring rate than that of the low-spring rate elastic body in series in the biasing direction, and
   the high-spring rate elastic body is made of resin.

2. The worm biasing structure according to claim 1, wherein the high-spring rate elastic body starts to be compressed before the low-spring rate elastic body reaches a compression limit.

3. The worm biasing structure according to claim 2, wherein the low-spring rate elastic body is formed by a coil spring, and
   the high-spring rate elastic body includes a guide portion guiding the coil spring in an extension/compression direction.

4. The worm biasing structure according to claim 2, wherein the low-spring rate elastic body is a flat-wire coil spring formed by flat wires being wound.

5. The worm biasing structure according to claim 1, wherein the low-spring rate elastic body is formed by a coil spring, and
   the high-spring rate elastic body includes a guide portion guiding the coil spring in an extension/compression direction.

6. The worm biasing structure according to claim 5, wherein the low-spring rate elastic body is a flat-wire coil spring formed by flat wires being wound.

7. The worm biasing structure according to claim 5, wherein the guide portion defines a space which receives at least a portion of the low-spring rate elastic body.

8. The worm biasing structure according to claim 5, wherein the guide portion is received within an internal space formed by the low-spring rate elastic body.

9. The worm biasing structure according to claim 5, further comprising a bottom wall portion disposed on an outer peripheral portion of the radial bearing,
   wherein a length of the guide portion in the radial direction is set to a length in which the guide portion touches the bottom wall portion before the low-spring rate elastic body reaches a compression limit.

10. The worm biasing structure according to claim 3, wherein the low-spring rate elastic body is a flat-wire coil spring formed by flat wires being wound.

11. The worm biasing structure according to claim 1, wherein the low-spring rate elastic body is a flat-wire coil spring formed by flat wires being wound.

12. The worm biasing structure according to claim 1, wherein the high-spring rate elastic body includes at least a solid resin body.

13. The worm biasing structure according to claim 1, wherein the low-spring rate elastic body is directly in contact with the high-spring rate elastic body.

14. The worm biasing structure according to claim 1, wherein an outer diameter of the high-spring rate elastic body is greater than an outer diameter of the low-spring rate elastic body.

\* \* \* \* \*